Figure 1:
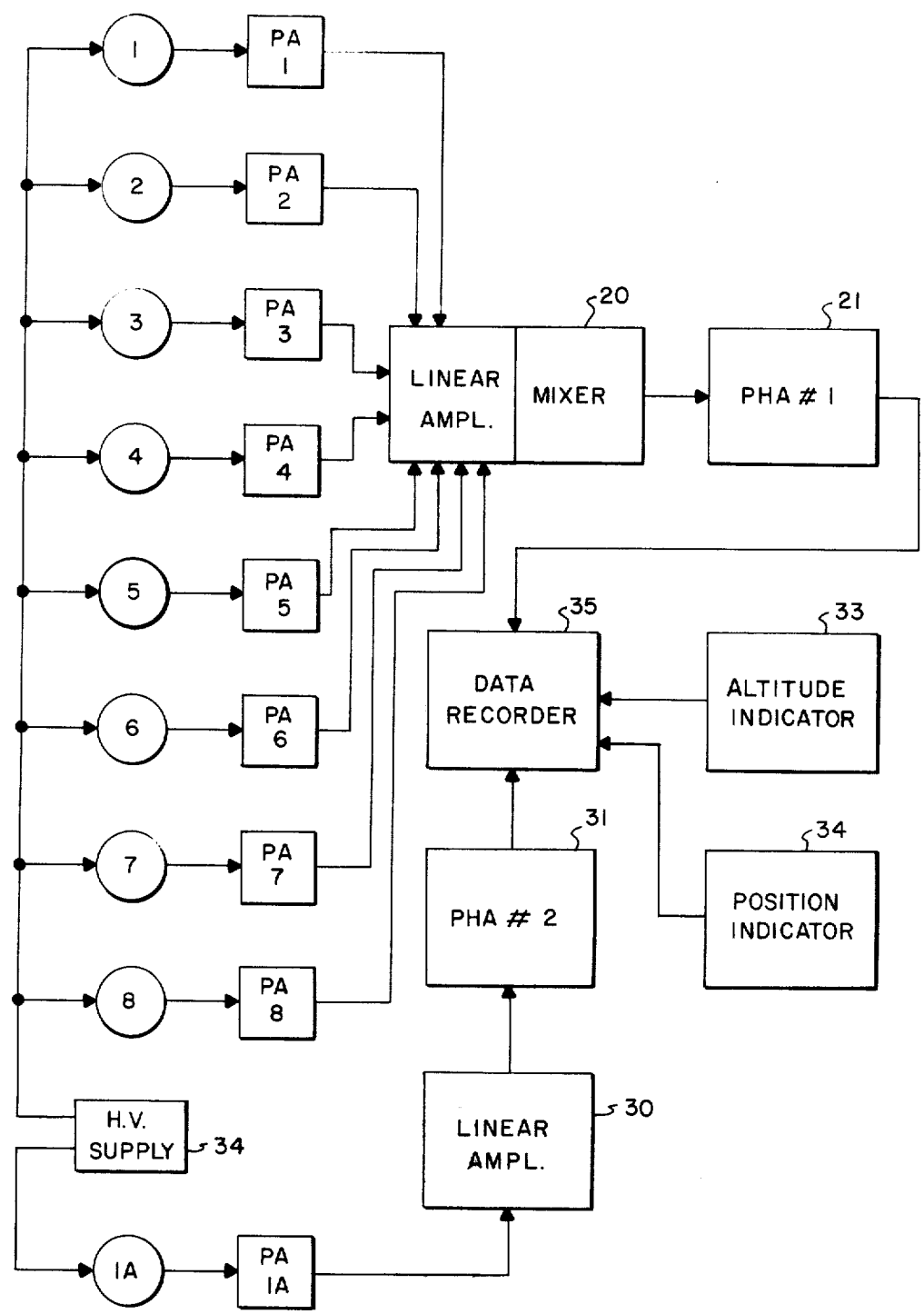

United States Patent [19]

Foote

[11] 3,919,547
[45] Nov. 11, 1975

[54] METHODS FOR LOCATING SUBTERANEAN PETROLEUM-BEARING DEPOSITS

[76] Inventor: Robert S. Foote, 742 Snowden, Richardson, Tex. 75080

[22] Filed: Nov. 1, 1973

[21] Appl. No.: 411,832

[52] U.S. Cl. ............ 250/253; 250/262; 250/303; 250/312
[51] Int. Cl. ............................... G01t 1/20
[58] Field of Search .......... 250/253, 256, 258, 303, 250/312

[56] References Cited
UNITED STATES PATENTS

| | | | |
|---|---|---|---|
| 2,686,266 | 8/1954 | Pringle et al. | 250/369 |
| 2,897,368 | 7/1959 | Lundberg et al. | 250/253 |
| 3,008,046 | 11/1961 | Carpenter | 250/253 |
| 3,105,149 | 9/1963 | Guitton et al. | 250/253 |
| 3,336,476 | 8/1967 | Richardson | 250/256 |
| 3,825,751 | 7/1974 | Johnson et al. | 250/253 |

OTHER PUBLICATIONS

Radioactivity & Nuclear Physics by James Cork, Published by Van Nostrand Co., (1950), pp. 32, 33, 372, 387.

*Primary Examiner*—Harold A. Dixon
*Attorney, Agent, or Firm*—Jack A. Kanz

[57] ABSTRACT

Disclosed are apparatus and methods for locating subteranean petroleum-bearing deposits by detecting the relative intensity of near-surface radiation of potassium-40. Areas of relative depletion of potassium-40 are plotted on a scale map to delineate the horizontal periphery of a petroleum deposit.

3 Claims, 2 Drawing Figures

METHODS FOR LOCATING SUBTERANEAN PETROLEUM-BEARING DEPOSITS

This invention relates to mineral prospecting. More particularly it relates to methods and apparatus for determining horizontal peripheral boundaries of subteranean petroleum-bearing deposits.

Various techniques have been developed over the years to aid in prospecting for mineral deposits. It has long been known that natural materials are gamma radioactive as a result of the distribution of uranium and thorium daughter products and potassium ($K^{40}$). The concentrations of radioactive material in particular soils and formations varies with the geological age and mineralization history of particular formations.

It is also well known that the presence of radioactive materials in subsurface regions may often be detected by measurement of surface or near surface radiation. Thus, measurement of the gross intensity of emitted gamma radiation has heretofore been utilized to detect high magnitude anomalies caused by outcroppings containing enrichment of uranium and thorium materials.

Prospecting for petroleum-bearing deposits has generally developed through techniques for determining shapes and distribution of subteranean geologic formations which, from experience, are known to be capable of acting as reservoirs for entrapped petroleum products.

It has now been discovered that the relative distribution of surface or near surface detected gamma radiation indicative of the presence of potassium-40 bears a definite relation to the horizontal periphery of a subteranean petroleum-bearing deposit. More particularly, it has been discovered that surface areas wherein the gamma radiation indicative of the presence of potassium-40 is low relative to adjacent surface regions characteristically define the horizontal periphery of subteranean petroleum-bearing deposits.

In accordance with the present invention methods and apparatus for determining the horizontal periphery of subteranean petroleum-bearing deposits are provided. The relative intensity of surface radiation indicative of potassium-40 is determined through the use of surface vehicles, underwater vehicles or airborne vehicles traversing a region of earth's surface while sensing the intensity of emitted gamma radiation. The measurements are taken at periodic intervals during a plurality of horizontally spaced substantially parallel linear traversals over a region of the earth's surface. Simultaneously, gamma radiation emanating from the atmosphere above the sensing apparatus is measured and recorded. The measurement of radiation in the atmosphere is conducted with sufficient regularity to detect naturally occurring variations in the gamma radiation sources present in the atmosphere. The detected gamma radiation from the surface is then corrected to reduce the effect of atmospheric borne sources of radiation.

In the preferred embodiment of the invention gamma radiation over a portion of an energy spectrum including the energy indicative of potassium-40 is sampled and the data mathematically reduced to determine relative concentrations of thallium-208($Tl^{208}$) to $K^{40}$. The ratio of $Tl^{208}$ to $K^{40}$ is then plotted on a scale map of the section of the earth's surface under investigation. The data points indicating relatively high values of $Tl^{208}$ to $K^{40}$ are connected to roughly define the horizontal periphery of any subteranean petroleum-bearing deposit.

It will be observed that the entire mapping process can be carried out with airborne apparatus rapidly and efficiently, thus providing the ability to explore for petroleum-bearing deposits in remote inaccessible areas without the use of land crews. It will also be observed that through the use of the method of the invention substantially the entire peripheral region of a petroleum-bearing deposit can be mapped. Known oil producing deposits can therefore be mapped to delineate the boundaries within which additional wells may be drilled with high likelihood of success.

Figure 2:
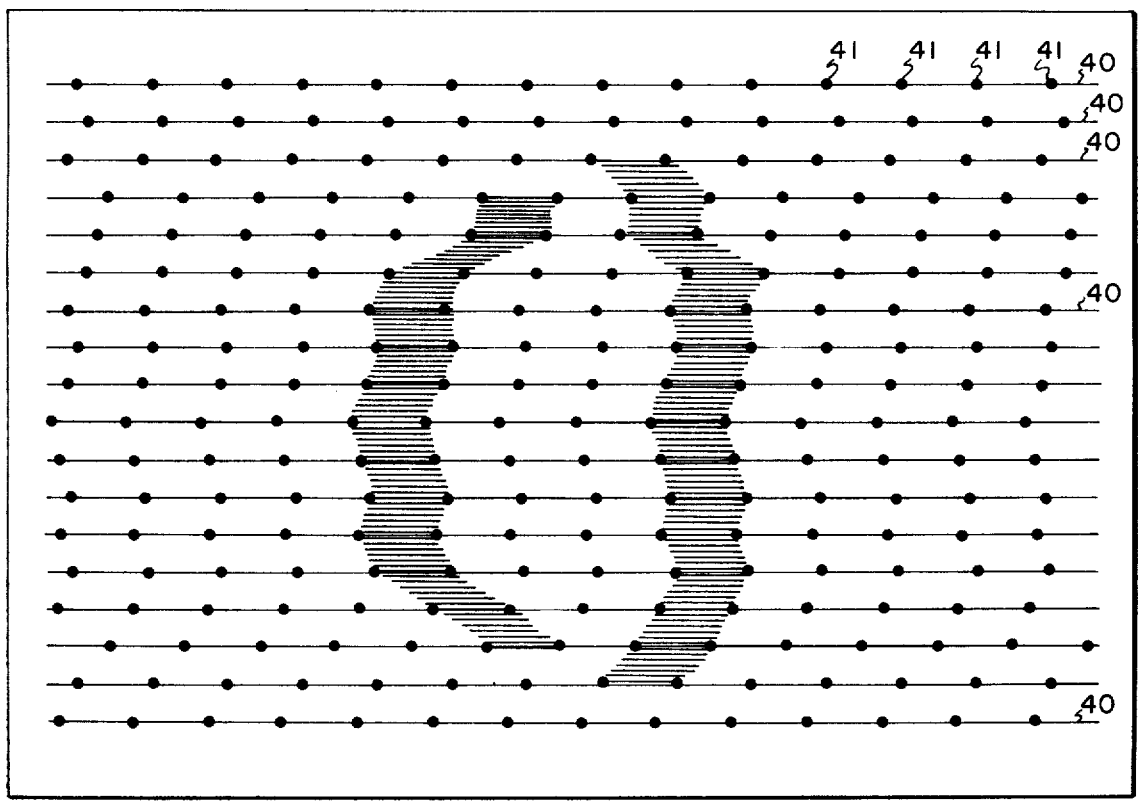

Other advantages and features of the invention will become more readily understood when taken in connection with the appended claims and attached drawings in which:

FIG. 1 is a diagrammatic illustration of airborne apparatus suitable for practicing the method of the invention; and FIG. 2 is a representative illustration of a scale map showing results obtained in accordance with the invention to define the horizontal periphery of a petroleum-bearing deposit.

Since the invention relies on the measurement of the relative intensity of near surface detected gamma radiation indicative of the presence of potassium-40, it will be readily appreciated that any suitable vehicle for traversing a section of the earth's surface may be employed. Obviously, the vehicle may be airborne or a surface vehicle. Likewise, the detection equipment may be adapted for underwater traversal of the earth's surface either by self-propelled or ship drawn underwater surface vehicle. It will be further observed, however, that in most applications (except over water) an airborne vehicle will be most efficient in terms of operating time, operating expense and convenience for rapidly gathering data over a large section of the earth's surface. Accordingly, the preferred embodiment of the apparatus employed for practicing the invention will be described herein with reference to airborne apparatus.

It is well known that uranium, thorium daughter products and potassium-40 emit gamma radiation falling within certain windows in the energy spectrum. For example, potassium-40 has a well-defined energy peak at about 1.46 MeV and thallium-208 has a distinct energy peak at about 2.62 MeV. Other materials emit gamma radiation in the same general portion of the energy spectrum. For example, bismuth-214 has a peak at about 1.76 MeV. Because of the interrelationships between the energy distributions of the several gamma emitters and cosmic radiation it is desirable that data be obtained for each of several windows in the spectrum under consideration. The count specific to each isotope is separated through data processing by data reduction using matrix algebra, least square techniques or the like. Furthermore, data collection and analysis must be normalized to account for cosmic radiation and airborne bismuth-214.

Apparatus suitable for collection of the required data is schematically illustrated in FIG. 1. The apparatus includes a plurality of thallium- activated sodium iodide crystal detectors 1–8. The detectors 1–8 are mounted in an aircraft to sense radiation emanating from the earth. The output of the detectors is fed into preamplifiers PA1–PA8, the output of each of which is fed into a linear amplifier. The output of each linear amplifier is fed into a mixer 20 and the output of the mixer fed into a pulse height analyzer 21.

To compensate for cosmic radiation and airborne bismuth-214, an additional upwardly-looking detector 1A is utilized. The upwardly-looking detector is identical in all respects to the detectors 1-8 but is shielded to detect only radiation emanating from the atmosphere above the level of the detector itself. Accordingly, detectors 1-8 detect all radiation, including that emanating from the surface of the earth as well as surrounding atmosphere and cosmic radiation, while detector 1A only detects that radiation in the surrounding atmosphere and cosmic radiation emanating from above detector 1A.

The output of upwardly looking detector 1A is fed into preamplifier PA1A. The output of the preamplifier PA1A is fed into a linear amplifier 30 and its output fed into a pulse height analyzer 31. The output of both pulse height analyzers 21 and 31 is fed into a suitable data recorder 35.

A high voltage supply 34 supplies the voltage necessary to energize detectors 1A and 1-8.

The shielding below detector crystal 1A may be any suitable material sufficient to absorb upwardly directed gamma radiation. In practice lead shielding approximately three inches thick is suitable. Alternatively, the shielding below upwardly looking detector crystal 1A may be adapted to detect upwardly-directed gamma radiation and the output of the shielding detector processed with the output of the upwardly looking detector to yield data determining the radiation emanating only from above the detector 1A.

Crystals 1A and 1-8, as noted above, should be sufficiently large to collect reliable statistical data. The number and size of the crystals will, of course, determine the number of counts detected per unit time for a given intensity of radiation. In practice, six to eight crystals 11½ inches by 4 inches thick have been found satisfactory for collecting data accumulated at one second intervals in an aircraft flying at about 120 miles per hour. Obviously, larger crystals may be used. Likewise, the number of crystals may be reduced if the vehicle travels at slower speeds.

The data collecting apparatus of FIG. 1 also includes an altitude indicating device 33 such as a radar altimeter. The output of the altitude indicator is also fed into the data recorder 35.

The counts received by the upwardly-looking detector 1A are amplified and accumulated for suitable time periods to produce statistically valid count numbers. The precise altitude of the aircraft at all times is fed directly into the data recorder 35 and the precise position of the aircraft is periodically determined by a position indicator 34. This information is also recorded in the data recorder 35.

In the preferred embodiment the aircraft is flown along a substantially straight course over the field under investigation at an altitude of about 400 feet at a speed of about 120 miles per hour. Detectors 1-8 are activated and the counts detected accumulated for one second. The accumulated count is then transferred from the pulse height analyzer 21 and a new one second accumulation period begun. Accordingly, the apparatus will produce data at one second intervals over the entire flight course, each datum point representing an average count over the distance travelled during one second. The upwardly-lookng detector 1A accumulates counts for five second or greater periods in much the same manner.

The position indicator 34 is preferably a tracking camera which takes exposures every three seconds coincident with the center of every third one second accumulation period.

It will be observed that an aircraft traversing a field under investigation at a velocity of 120 mph will take one second data points every 176 feet. The data accumulated by the apparatus described above and recorded in the data recorder 35 are then processed by known methods to determine the ratio of thallium-208 to potassium-40 at one second intervals over the course flown. Since the data points represent average count ratios over the linear path traversed, the data points may be plotted at 176 feet intervals on a scale map of the track of the aircraft over the surface of the region under investigation to produce a map of relative intensity of $Tl^{208}$ to $K^{40}$ over the region under investigation. An illustration of the map produced is shown in FIG. 2.

It will be appreciated that variations of $K^{40}$ will occur naturally, without regard to petroleum-bearing deposits. Such variations, however, are usually gradual and do not occur as narrow bands of relative depletion except adjacent the horizontal periphery of a subteranean petroleum-bearing deposit. Accordingly, to acquire data sufficient to clearly identify the depletion regions, relative by long traversal lines, on the order of several miles or more, should be used. Likewise the reliability of the data obtained is proportional to the number of traversals. Preferably, the traversals are about one-fourth to one-half mile apart.

In order to amplify the regions of $K^{40}$ depletion and to remove, to a large degree, any dependence on variations in surface soils, the data are plotted as a ratio of $Tl^{208}$ to $K^{40}$. The concentration of $Tl^{208}$ is not depleted in the regions adjacent to petroleum fields, but varies as soils change. The natural variation of $Tl^{208}$, however, is coincident with natural variation of $K^{40}$, except in the regions adjacent a petroleum deposit. Accordingly, if the data are plotted as a ratio of $Tl^{208}$ to $K^{40}$, the results obtained will be essentially constant except in the regions of depletion of $K^{40}$.

It will be appreciated that the map of FIG. 2 represents an idealized portrayal of the data obtained. Each of the horizontal lines 40 represents the track of the aircraft carrying the detection apparatus of FIG. 1. As described above, the exact position of the aircraft is determined by reference to the photographs taken by the tracking camera. The position of the aircraft is then plotted on the map as points 41 and lines 40 drawn between the points 41 to establish the track of the aircraft. In actual practice lines 41 will not lie in a straight line because of flight of the aircraft. However, the map of FIG. 2 illustrates ideal conditions.

When the count data accumulated as described above are normalized to account for all variables and reduced to a ratio of $Tl^{208}$ to $K^{40}$, the data are plotted on the map at points 41 coincident with the actual point where the data were gathered.

The numerical value of each data point will be substantially constant throughout the area surveyed even though natural variations of thallium-208 and potassium-40 may occur since, except in areas where the $K^{40}$ has been depleted, variations of $K^{40}$ and $Tl^{208}$ will occur simultaneously. However, relative depletion of $K^{40}$ will be indicated by a relatively high mathematical value of $Tl^{208}$ to $K^{40}$. Since the data are treated as the ratio of $Tl^{208}$ to $K^{40}$, small relative depletions of $K^{40}$ will be amplified to yield a significantly high value of $Tl^{208}$ to $K^{40}$.

To delineate the horizontal periphery of a subteranean petroleum- bearing deposit, the data points indicating a significant depletion of $K^{40}$ are identified. Since the values of all data points (except those in areas of $K^{40}$ depletion) will be substantially uniform, a mean value for all data points can be readily established. Those data points varying from the mean value by a statistically signficant value indicate areas of substantial depletion of $K^{40}$. The area surrounding the periphery of an underground petroleum-bearing deposit may then be located on the map by interconnecting by shading between any two adjacent data points having values deviating from the mean value by statistically significant amounts. A shaded outline will be produced which corresponds to the region adjacent the deposit. The amount by which any data point value may deviate from the mean value and be considered a statistically significant variation will vary under different field and geologic conditions. For most applications a data point having a value exceeding approximately twice standard deviation may be considered a statistically significant variation.

Referring to FIG. 2 it will be observed that shading as described above will produce an almost continuous strip enclosing a region wherein no variation in relative intensity of $K^{40}$ is observed. The region enclosed, however, corresponds to the horizontal periphery of a petroleum-bearing deposit. The drawing of FIG. 2 is not, of course, drawn to scale. Ordinarily the width of the $K^{40}$ depletion region will be larger than 176 feet, thus several data points having values varying from the mean by significant amounts will be observed during each traversal of the relative depletion region.

It will be readily apparent that other related data may be collected concurrently with the radiation data collected in accordance with the invention. For example, conventional aerial magnetic data may be collected and used in connection with the radiation data to further aid in identification and verification of geologic formations capable of acting as petroleum reservoirs.

While the invention has been described with specific reference to airborne surveying apparatus, it will be readily appreciated that similar results can be obtained with surface vehicles. In surface vehicles statistically better information may be obtained since the detector may be maintained at a particular point for an indefinite period of time to obtain better count information. However, the data collection process will take much longer.

Likewise, underwater surface vehicles can be used to obtain surface gamma radiation information. The vehicles may be either self- propelled or ship drawn. It will be apparent that for underwater data collection apparatus the upwardly looking detector may be eliminated since a body of water will ordinarily shield the apparatus from cosmic radiation and the concentration of gamma emitters naturally occurring in sea water is so low as to present little or no background radiation problem.

It is to be understood that although the invention has been described with particular reference to specific embodiments thereof, the forms of the invention shown and described in detail are to be taken as the preferred embodiments of same, and that various changes and modifications may be resorted to without departing from the spirit and scope of the invention as defined by the appended claims.

What is claimed is:

1. The method of identifying the peripheral regions adjacent a subteranean petroleum-bearing deposit comprising the steps of
   a. traversing a linear section of the surface of the earth,
   b. measuring gamma radiation indicative of $K^{40}$ and $Tl^{208}$ at periodic intervals during said traverse, and
   c. locating regions within said linear section wherein the ratio of gamma radiation indicative of $Tl^{208}$ to gamma radiation indicative of $K^{40}$ is high relative to surrounding regions.

2. The method of determining the horizontal periphery of a subteranean petroleum-bearing deposit comprising the step of locating regions at the surface of the earth wherein the gamma radiation indicative of the presence of $K^{40}$ is low relative to adjacent regions wherein the relative depletion of $K^{40}$ is determined by
   a. sensing the radiation indicative of $K^{40}$ at a plurality of locations near the earth's surface,
   b. simultaneously sensing the radiation indicative of $Tl^{208}$ at said plurality of locations,
   c. determining the ratio of $Tl^{208}$ to $K^{40}$ at said plurality of locations, and
   d. plotting the ratios obtained on a scale map of the area of the earth's surface under investigation.

3. The method set forth in claim 2 including the step of interconnecting all adjacent data points on said scale map which have a statistically significant value higher than the mean value of all data points on said scale map.

* * * * *

UNITED STATES PATENT OFFICE
CERTIFICATE OF CORRECTION

Patent No. 3,919,547        Dated November 11, 1975

Inventor(s) Robert S. Foote

It is certified that error appears in the above-identified patent and that said Letters Patent are hereby corrected as shown below:

Column 1, lines 63, 64 and 67,

Column 4, lines 37 (both occurrences), 39, 42, 59, and 66,

Column 5, lines 2, 3, and 4

Column 6, lines 28, 30, 42 and 43, "$Tl^{208}$" should read -- $Tl^{208}$ --.

Column 3, line 67, "upwardly-lookng" shoule read -- upwardly-looking --.

Column 4, line 29, "relative by" should read -- relatively --.

Signed and Sealed this seventeenth Day of February 1976

[SEAL]

Attest:

RUTH C. MASON
*Attesting Officer*

C. MARSHALL DANN
*Commissioner of Patents and Trademarks*